(12) United States Patent
Mi et al.

(10) Patent No.: US 10,471,888 B2
(45) Date of Patent: Nov. 12, 2019

(54) LIGHT-GUIDED WARNING LAMP USED IN LANE CHANGE AT BLIND ZONE OF A VEHICLE

(71) Applicant: MAGNA MIRRORS (TAICANG) AUTOMOTIVE TECHNOLOGY CO., LTD., Jiangsu (CN)

(72) Inventors: Zhenxing Mi, Jiangsu (CN); Zhongyin Shen, Jiangsu (CN)

(73) Assignee: Magna Mirrors (Taicang) Automotive Technology Co., LTD. (CN)

( * ) Notice: Subject to any disclaimer, the term of this patent is extended or adjusted under 35 U.S.C. 154(b) by 11 days.

(21) Appl. No.: 15/787,036

(22) Filed: Oct. 18, 2017

(65) Prior Publication Data

US 2019/0039508 A1    Feb. 7, 2019

(30) Foreign Application Priority Data

Aug. 2, 2017    (CN) .................... 2017 2 0953756 U

(51) Int. Cl.
*B60Q 1/26* (2006.01)
*B60Q 3/258* (2017.01)
*B60R 1/08* (2006.01)

(52) U.S. Cl.
CPC .......... *B60Q 1/2665* (2013.01); *B60Q 3/258* (2017.02); *B60R 1/081* (2013.01)

(58) Field of Classification Search
None
See application file for complete search history.

(56) References Cited

U.S. PATENT DOCUMENTS

| 4,257,084 | A | * | 3/1981 | Reynolds | G01D 11/28 116/288 |
| 5,671,994 | A | * | 9/1997 | Tai | F21V 5/02 362/23.15 |
| 8,698,647 | B2 | * | 4/2014 | Huang | B60Q 1/2611 340/471 |
| 2006/0176702 | A1 | * | 8/2006 | Shen | B60Q 1/2611 362/295 |
| 2008/0074279 | A1 | * | 3/2008 | Chiu | B60Q 1/2611 340/815.45 |
| 2017/0192138 | A1 | * | 7/2017 | Chang | G02B 5/02 |

* cited by examiner

*Primary Examiner* — Elmito Breval
(74) *Attorney, Agent, or Firm* — Avery N. Goldstein; Blue Filament Law PLLC

(57) ABSTRACT

A warning lamp used in lane change at blind zone of a vehicle includes a light source and a light guide including a light entrance surface, a first reflective surface, a second reflective surface, and a light exit surface, the light entrance surface is located above the light source so that the light emitted from the light source is converted to parallel light through the light entrance surface, said first reflective surface is arranged aslope above the light entrance surface, sides of s the first reflective surface are provided with the second reflective surface and the light exit surface, respectively, the first and second reflective surface are provided with total reflection stripes configured so that said parallel light is totally reflected to the second reflective surface through the first reflective surface and then totally reflected by the second reflective surface to said light exit surface to form uniform warning light.

11 Claims, 3 Drawing Sheets

LIGHT-GUIDED WARNING LAMP USED IN LANE CHANGE AT BLIND ZONE OF A VEHICLE

FIELD OF THE TECHNOLOGY

The utility model generally relates to the technical field of automotive parts, especially to the technical field of automotive lights, in particular to a light-guided warning lamp used in lane change at blind zone of a vehicle.

BACKGROUND OF THE INVENTION

The warning lights used in blind zone or assisted in lane change in the prior art reflect the light to the desired area from the LED or other light source through the aluminum-plated housing. However, due to the limitations of the existing design of the product itself, the light-emitting area of the product is not smooth, the ratio of the brightest point to the darkest point in the light-emitting area is about 7:1, affecting the consumer's driving experience. For the products having large light-emitting area, multiple light sources or LEDs are to be equipped, increasing costs of product.

SUMMARY OF THE INVENTION

The utility model aims to overcome the deficiencies of the prior art, and to provide a light-guided warning lamp used in lane change at blind zone of a vehicle which has a large light-emitting surface and can emit the warning light evenly.

In order to achieve the above purpose, the present utility model, a light-guided warning lamp used in lane change at blind zone of a vehicle, comprising:

a light source and a light guide including a light entrance surface, a first reflective surface, a second reflective surface, and a light exit surface, said light entrance surface is located above the light source so that the light emitted from the light source is converted to parallel light through the light entrance surface, said first reflective surface is arranged aslope above said light entrance surface, sides of said first reflective surface are provided with said second reflective surface and said light exit surface, respectively, the first and second reflective surface are provided with total reflection stripes configured so that said parallel light is totally reflected to the second reflective surface through the first reflective surface and then totally reflected by the second reflective surface to said light exit surface to form uniform warning light.

Preferably, said total reflection stripes of said first and second reflective surface comprise a preset total reflection angle and said parallel light is totally reflected to the second reflective surface through the first reflective surface and then totally reflected by the second reflective surface to said light exit surface to form uniform warning light by adjusting said preset total reflection angle.

Preferably, said warning lamp further comprising a housing, said light source and light guide are arranged in a cavity of said housing.

Preferably, said warning lamp is provided with a light transmission region having a preset geometric pattern, said light transmission region is arranged so that said warning light is transmitted.

Preferably, said preset geometric pattern of said light transmission region is triangular, quadrilateral, circular, or vehicle profile.

Preferably, said light source is provided on a circuit board.

Preferably, outer surface of said light exit surface is provided with a diffusion film for increasing the uniformity of said warning light and increasing the exit angle of said warning light.

Preferably, said warning lamp further includes a mask having surface atomization or atomizing material.

Preferably, said warning lamp is provided inside a rear-view mirror of the vehicle, and the warning light is displayed on the mirror surface of said rearview mirror.

Preferably, said light exit surface is provided with refractive stripes.

The light-guided warning lamp used in lane change at blind zone of a vehicle according to the present utility model can reflect the light into the target area evenly through a special light guide design. The special light guide design of the present utility model mainly uses the basic principle of physical optics, specifically, the light emitted from the LED or other light source is converted to parallel light from the light entrance surface to the first reflecting surface and then is totally reflected into the light guide body through the total reflection stripes of the first reflecting surface and then is emitted from the light exit surface of the light guide main body through the second reflection surface of the light guide body, so as to obtain uniform warning light. At the light exit surface, a diffusion film can be added to increase the exit angle of said warning light. The exit angle of said warning light and the uniformity of said warning light could be adjusted by adjusting the angle of the refractive stripes of the first reflecting surface, the second reflecting surface, or the light exit surface. The light-guided warning light used in lane change at blind zone of a vehicle according to the present utility model can be mounted on the back of the rear-view mirror, and the warning light is displayed on the mirror of the vehicle rearview mirror. When another vehicle is present around the rear side of the vehicle during the lane change, the light source of the warning lamp will light and then the mirror of the rearview mirror will display the warning light so that to remind the driver that it is dangerous to change the lane.

Figure 1:
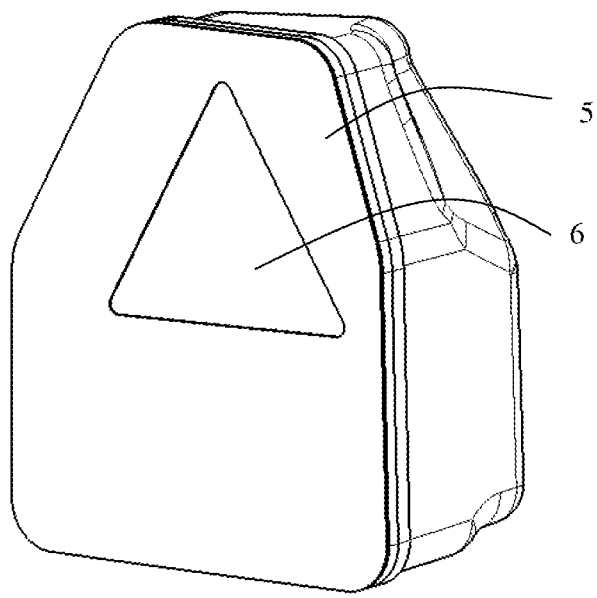
FIG. 1 is a schematic view showing the overall structure of a light-guided warning lamp used in lane change at blind zone of a vehicle according to the present utility model.
Figure 2:
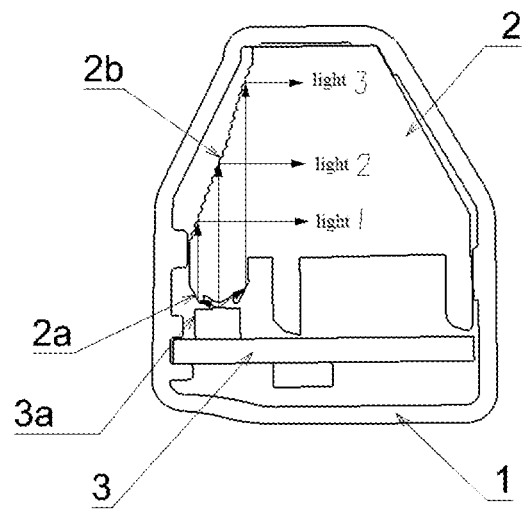
FIG. 2 is a cross-sectional view of a longitudinal view of a light-guided warning lamp used in lane change at blind zone of a vehicle according to the present utility model.
Figure 3:
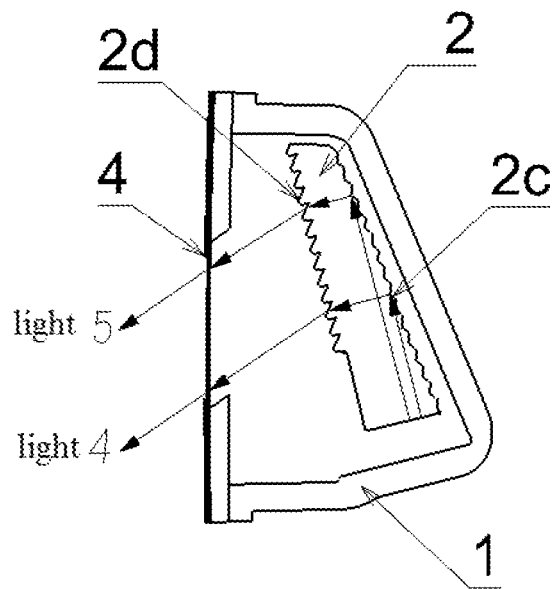
FIG. 3 is a cross-sectional view of a cross-section of a light-guided warning lamp used in lane change at blind zone of a vehicle according to the present utility model.
Figure 4:
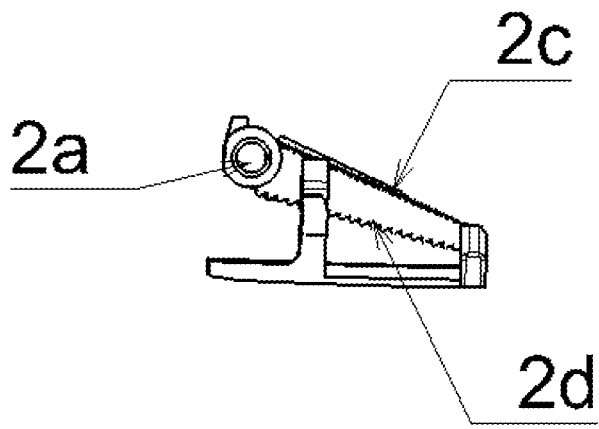
FIG. 4 is an upward view of a light-guided warning lamp used in lane change at blind zone of a vehicle according to the present utility model.
Figure 5:
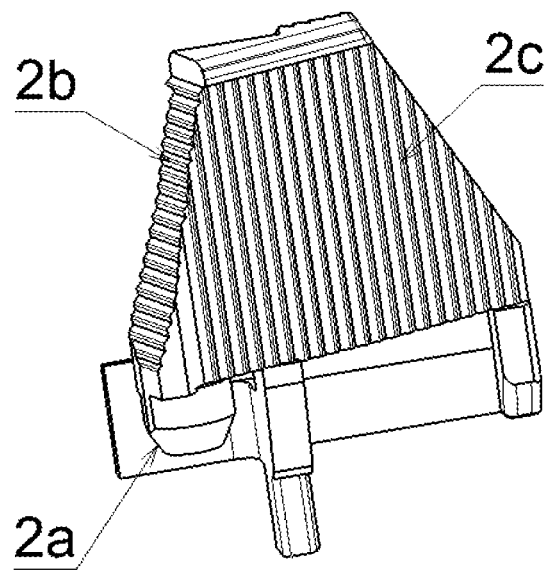
FIG. 5 is a schematic view showing a first structure of a light-guided warning lamp used in lane change at blind zone of a vehicle according to the present utility model.
Figure 6:
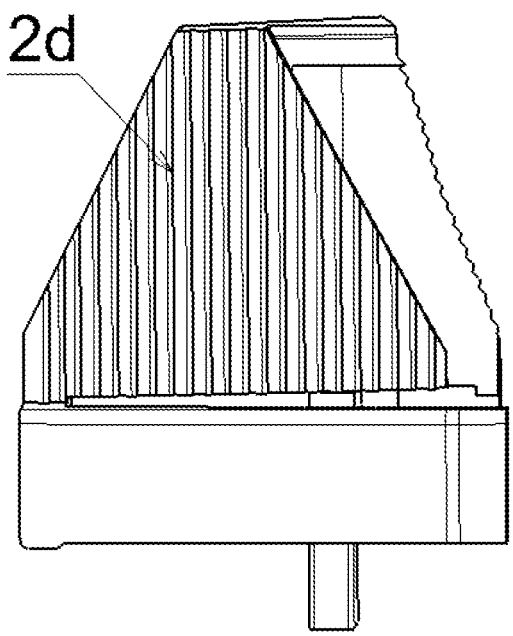
FIG. 6 is a schematic view showing a second structure of a light-guided warning lamp used in lane change at blind zone of a vehicle according to the present utility model.

wherein:
1 housing
2 light guide
3 circuit board
4 diffusion film
2*a* light entrance surface
2*b* first reflective surface 2c second reflective surface
2d light exit surface
3a light source
5 mask
6 light transmission region

DETAILED DESCRIPTION

In order to understand the technical content of the present utility model clearly, the present invention is further exemplified by reference to the following example.

As shown in the FIG. 1-6, a light-guided warning lamp used in lane change at blind zone of a vehicle according to one embodiment of the present utility model, comprising: a light source 3a and a light guide 2 including a light entrance surface 2a, a first reflective surface 2b, a second reflective surface 2c, and a light exit surface 2d, said light entrance surface 2a is located above the light source 3a so that the light emitted from the light source is converted to parallel light through the light entrance surface, said first reflective surface 2b is arranged aslope above said light entrance surface 2a, sides of said first reflective surface 2b are provided with said second reflective surface 2c and said light exit surface 2d, respectively, the first and second reflective surface 2b, 2c are provided with total reflection stripes configured so that said parallel light is totally reflected to the second reflective surface through the first reflective surface and then totally reflected by the second reflective surface to said light exit surface to form uniform warning light.

In a preferred embodiment, the total reflection stripes of said first and second reflective surface 2b, 2c comprise a preset total reflection angle and said parallel light is totally reflected to the second reflective surface through the first reflective surface and then totally reflected by the second reflective surface to said light exit surface to form uniform warning light by adjusting said preset total reflection angle.

In a preferred embodiment, the warning lamp as shown in FIG. 1 further comprising a housing 1, the light source and light guide are arranged in a cavity of the housing 1.

In a preferred embodiment, the warning lamp is provided with a light transmission region 6 having a preset geometric pattern, said light transmission region 6 is arranged so that said warning light is transmitted. The preset geometric pattern of the light transmission region may be set to any pattern, such as a triangle, a quadrangle, a circle, or a vehicle contour pattern, depending on the actual needs. The present utility model does not limit the geometrical pattern of the light transmission region. The light transmission region may be provided on the mask and/or the diffusion film as required.

In a preferred embodiment, the light source is provided on a circuit board 3, wherein the light source may be one or more.

In a preferred embodiment, outer surface of said light exit surface 2d is provided with a diffusion film 4 for increasing the uniformity of said warning light and increasing the exit angle of said warning light.

In a preferred embodiment, the warning lamp further includes a mask 5 having surface atomization or atomizing material. Some embodiments of the present utility model can set the diffusion film only according to the actual needs, or set both the diffusion film and the mask at the same time.

In a preferred embodiment, the warning lamp is provided inside a rearview mirror of the vehicle, and the warning light is displayed on the mirror surface of said rearview mirror.

In a preferred embodiment, the light exit surface is provided with refractive stripes. It is possible to selectively set the refractive stripes of the light exit surface depending on the angular relationship between the incident light and the outgoing light and other needs, and may be unnecessary in some embodiments.

The a light-guided warning lamp used in lane change at blind zone of a vehicle according to the present utility model could ensure the ratio of the brightest point to the darkest point less than 2:1 in the light emitting area of 12 mm*12 mm.

The light-guided warning lamp used in lane change at blind zone of a vehicle according to the present utility model can reflect the light into the target area evenly through a special light guide design. The special light guide design of the present utility model mainly uses the basic principle of physical optics, specifically, the light emitted from the LED or other light source is converted to parallel light from the light entrance surface to the first reflecting surface and then is totally reflected into the light guide body through the total reflection stripes of the first reflecting surface and then is emitted from the light exit surface of the light guide main body through the second reflection surface of the light guide body, so as to obtain uniform warning light. At the light exit surface, a diffusion film can be added to increase the exit angle of said warning light. The exit angle of said warning light and the uniformity of said warning light could be adjusted by adjusting the angle of the refractive stripes of the first reflecting surface, the second reflecting surface, or the light exit surface. The light-guided warning light used in lane change at blind zone of a vehicle according to the present utility model can be mounted on the back of the rear-view mirror, and the warning light is displayed on the mirror of the vehicle rearview mirror. When another vehicle is present around the rear side of the vehicle during the lane change, the light source of the warning lamp will light and then the mirror of the rearview mirror will display the warning light so that to remind the driver that it is dangerous to change the lane.

In the present specification, the present invention has been described according to the particular embodiments. But it is obvious that these embodiments can be modified or changed without departure from the spirit and scope of the present invention. Therefore, the specification described above is exemplary only and not intended to be limiting.

We claim:

1. A warning lamp used in lane change at blind zone of a vehicle, comprising: a light source and a light guide including a light entrance surface, a first reflective surface, a second reflective surface, and a light exit surface, said light exit surface is oppositely opposed to said second reflective surface, said light entrance surface is located above said light source so that light emitted from said light source is converted to parallel light through said light entrance surface, said first reflective surface is arranged aslope above said light entrance surface and between said second reflective surface and said light exit surface, said first and second reflective surfaces are provided with total reflection stripes configured so that said parallel light is totally reflected to said second reflective surface by said first reflective surface and then totally reflected by said second reflective surface to said light exit surface to form uniform warning light.

2. The warning lamp used in lane change at blind zone of a vehicle of claim 1, wherein said total reflection stripes of said first and second reflective surfaces comprise a preset total reflection angle and said parallel light is totally reflected to said second reflective surface by said first reflective surface and then totally reflected by said second reflective surface to said light exit surface to form uniform warning light by adjusting said preset total reflection angle.

3. The warning lamp used in lane change at blind zone of a vehicle of claim 1, wherein said warning lamp further comprising a housing, said light source and light guide are arranged in a cavity of said housing.

4. The warning lamp used in lane change at blind zone of a vehicle of claim 1, wherein said warning lamp is provided with a light transmission region having a preset geometric pattern, said light transmission region is arranged so that said warning light is transmitted.

5. The warning lamp used in lane change at blind zone of a vehicle of claim 4, wherein said preset geometric pattern of said light transmission region is triangular, quadrilateral, circular, or vehicle profile.

6. The warning lamp used in lane change at blind zone of a vehicle of claim 1, wherein said light source is provided on a circuit board.

7. The warning lamp used in lane change at blind zone of a vehicle of claim 1, wherein an outer surface of said light exit surface is provided with a diffusion film for increasing the uniformity of said warning light and increasing the exit angle of said warning light.

8. The warning lamp used in lane change at blind zone of a vehicle of claim 7, wherein said warning lamp further includes a mask having surface atomization or atomizing material.

9. The warning lamp used in lane change at blind zone of a vehicle of claim 1, wherein said warning lamp further includes a mask having surface atomization or atomizing material.

10. The warning lamp used in lane change at blind zone of a vehicle of claim 1, wherein said warning lamp is provided inside a rearview mirror of the vehicle, and said warning light is displayed on a mirror surface of said rearview mirror.

11. The warning lamp used in lane change at blind zone of a vehicle of claim 1, wherein said light exit surface is provided with refractive stripes.

* * * * *